(12) United States Patent
Jones et al.

(10) Patent No.: US 6,275,628 B1
(45) Date of Patent: Aug. 14, 2001

(54) SINGLE-ENDED LONG PERIOD GRATING OPTICAL DEVICE

(75) Inventors: Mark E. Jones, Blacksburg; Kent A. Murphy, Troutville; Jennifer L. Elster, Blacksburg; Michael F. Gunther, Blacksburg; Thomas A. Wavering, Blacksburg, all of VA (US)

(73) Assignee: Luna Innovations, Inc., Blacksburg, VA (US)

( * ) Notice: Subject to any disclaimer, the term of this patent is extended or adjusted under 35 U.S.C. 154(b) by 0 days.

(21) Appl. No.: 09/440,499

(22) Filed: Nov. 15, 1999

Related U.S. Application Data (60) Provisional application No. 60/160,061, filed on Dec. 10, 1998.

(51) Int. Cl.[7] .................................................. G02B 6/26
(52) U.S. Cl. ............................................... 385/29; 385/37
(58) Field of Search ................................ 385/12, 13, 27, 385/28, 29, 37, 123, 124

(56) References Cited

U.S. PATENT DOCUMENTS

| | | |
|---|---|---|
| 4,844,613 | 7/1989 | Batchelder et al. . |
| 4,929,049 | 5/1990 | Goullon et al. . |
| 4,950,883 | 8/1990 | Glenn . |
| 5,026,139 | 6/1991 | Klainer et al. . |
| 5,048,913 | 9/1991 | Glenn et al. . |
| 5,064,619 | 11/1991 | Finlan . |
| 5,067,788 | 11/1991 | Jannson et al. . |
| 5,173,747 | 12/1992 | Bolarski et al. . |
| 5,253,037 | 10/1993 | Klainer et al. . |
| 5,359,680 | 10/1994 | Riviere . |
| 5,430,817 | 7/1995 | Vengsarkar . |
| 5,485,277 | 1/1996 | Foster . |
| 5,492,840 | 2/1996 | Malmqvist et al. . |
| 5,641,956 | * 6/1997 | Vengsarkar et al. ............ 250/227.14 |
| 5,864,641 | 1/1999 | Murphy et al. . |

OTHER PUBLICATIONS

A.D. Kersey et al.; "Fiber Grating Sensors"; *Journal of Lightwave Technology*; Aug. 1997; pp. 1442–1463; vol. 15, No. 8; IEEE; U.S.A.

A. Asseh et al.; "Fiber Optical Bragg Grating Refractometer"; *Fiber and Integrated Optics*; Apr. 18, 1997; pp. 51–62; vol. 17; Taylor & Francis, U.S.A.

J.A. Greene et al.; "Grating–Based Optical Fiber Corrosion Sensors"; *SPIE*; Mar. 1997; pp. 260–266; vol. 3042; U.S.A.

V. Bhatia et al., "Optical Fiber Long–Period Grating Sensors," *Lightnews*, Winter 1995, pp. 6–11, U.S.A.

A. M. Vengsarkar et al., "Long–Period Gratings as Band Rejection Filters," *OFC '95*, Feb. 26–Mar. 3, 1995, pp. PD4–1–PD4–5.

T. A. Tran et al., "Real–time Immunoassays Using Fiber Optic Long–Period Grating Sensors," *Biomedical Sensing, Imaging, and Tracking Technologies I*, Proceedings SPIE–The International Society for Optical Engineering, R.A. Lieberman et al., Eds., vol. 2676, Jan. 29–31, 1996, pp. 165–170, U.S.A.

(List continued on next page.)

*Primary Examiner*—Akm E. Ullah
*Assistant Examiner*—Michelle R. Connelly-Cushwa
(74) *Attorney, Agent, or Firm*—Joy L. Bryant (57) ABSTRACT

A single-ended long period grating optical device is presented. The single-ended optical device comprises an optical waveguide having at least one core mode and a plurality of cladding modes. At least one long period grating couples light from the core mode to the cladding modes. A reflector is positioned in an operable relationship to the long period grating, and the reflector reflects a signal. A mode stripper is positioned after the long period grating and removes the cladding modes from a transmitted signal and the reflected signal.

49 Claims, 7 Drawing Sheets

OTHER PUBLICATIONS

A. M. Vengsarkar et al., "Long–Period Fiber Gratings as Gain–Flattening and Laser Stabillizing Devices," *Tenth International Conference on Integrated Optics and Optical Fiber Communication*, vol. 5, Jun. 26–30, 1995, pp. 3–4.

A. M. Vengsarkar et al., "Long–Period Fiber Gratings as Band–Rejection Filters," *Journal of Lightwave Technology*, vol. 14, No. 1, Jan. 1996, pp. 58–65, U.S.A.

A. M. Vengsarkar et al., "Long–Period Cladding–Mode–Coupled Fiber Gratings: Properties and Applications," *1995 Technical Digest Series*, vol. 22, Sep. 9–11, 1995, pp. SaB2–1–SaB2–4.

K.O. Hill et al., "Photosensitivity in Optical Fiber Waveguides: Application to Reflection Filter Fabrication," *Appl. Phys. Lett.*, 32 (10), May 15, 1978, pp. 647–649.

* cited by examiner

SINGLE-ENDED LONG PERIOD GRATING OPTICAL DEVICE

CROSS-REFERENCE TO RELATED APPLICATIONS

This application claims the benefit of U.S. Provisional Application No. 60/160,061, entitled, "Single-Ended Long Period Grating Optical Device," filed Dec. 10, 1998.

FIELD OF THE INVENTION

The present invention relates to optical devices. In particular, it relates to long period grating optical devices which are capable of undergoing single-ended operation.

BACKGROUND OF THE INVENTION

Optical fiber gratings are well established components that have been used in industry for communication and sensing applications. These devices are formed by exposing a germanosilicate fiber to spatially periodic intensity from a high-power ultraviolet (UV) source. Interaction with the UV light affects molecular binding within the optical fiber core and creates refractive index perturbations. The perturbations form a grating structure. Based on periodicity, the grating will selectively reflect or couple light at a specific band of wavelengths to guided or nonguided modes of the waveguide.

Long period gratings typically have a plurality of index perturbations of width w spaced apart by a periodic distance $\Lambda$, where typically 50 $\mu$m $\leq \Lambda \leq$ 1500 $\mu$m. The perturbations are formed within the core of the waveguide and form an angle with the longitudinal axis of the waveguide. The waveguide is designed to transmit broadband light at a wavelength centered about $\lambda$. The spacing of the perturbations is chosen to couple transmitted light in the region of at least one wavelength from the guided mode into lossy non-guided modes in the cladding thereby reducing in intensity the band of light centered about a plurality of coupling wavelengths.

Vengsarkar et al. (U.S. Pat. No. 5,641,956) describe an optical waveguide sensor arrangement which comprises an optical waveguide having guided modes, lossy non-guided modes, and a long period grating coupling the guided modes to the lossy non-guided modes. The light contained in the non-guided modes interact with surface defects on the optical waveguide and is rapidly attenuated. These modes are referred to as lossy. The long period grating can be used as a sensor because it converts light traveling in the guided modes of the optical waveguide to the lossy non-guided modes of the optical waveguide at one or more wavelengths as determined by various environmental parameters being measured. This produces a wavelength transmission spectrum functionally dependent on the parameter sensed.

Long period gratings are typically used to couple light from the core mode to the forward propagating cladding mode to result in a transmitted signal. However, if long period gratings are to be used in reflection, external methods must be implemented to return the signal through the input fiber. One way this is achieved is by placing a reflector or filter over the entire fiber endface after the long period grating. In so doing, a reflective metal such as gold or a dielectric is deposited onto the fiber endface surface. Since the reflector covers the entire fiber endface, the cladding modes coupled by the long period grating are reflected as well as the fundamental mode. Placement of the mirrored fiber endface with respect to the long period grating is critical so the cladding modes are properly extinguished upon their reflection from the fiber endface and prior to returning back through the long period grating. Failure to extinguish the cladding mode light before re-entry into the long period grating results in recoupling the light in the cladding modes back into the fundamental mode. One way to avoid this is to place or provide a long segment of lower index buffered fiber after the long period grating to absorb light in the cladding mode. Hence, only light in the fundamental mode will be transmitted to the end of the fiber where it will be reflected back through the input fiber. The problem with this design is that the device becomes unnecessarily large and the packaging requirements become more stringent.

A similar method involves placing a reflector only within or on the fiber core. This is done by writing additional broadband reflective gratings after the long period grating. Because only the core signal is reflected, most of the cladding mode is essentially stripped. Thus, no significant recoupling of the cladding mode occurs. However, this technique requires expensive and time consuming fabrication processes.

Alternatively, a long period grating may be written with partial coupling of light into the cladding mode. Based on coupling conditions and the recoupling of reflected light back into the fiber, partial coupling to the cladding will be maintained and a long period grating signal with limited isolation results. This result is useful for some applications but numerous applications require greater coupling efficiency. Specific examples include chemical and biological sensing applications where the long period grating is brought into contact with various solutions. The solutions disturb the boundary conditions for the long period grating. If the isolation of the long period grating is small, the signal from the long period grating will be lost. Therefore, large isolation levels are required.

An object of the present invention is to provide a long period grating based single-ended optical device which produces high isolation of the long period grating in reflection and good coupling efficiency.

Another object of the present invention is to provide a long period grating based single-ended optical device which has large isolation levels.

Another object of the present invention is to provide a long period grating based single-ended optical device whose reflecting element is not sensitive to external perturbations.

Another object of the present invention is to provide a long period grating based single-ended optical device which is compact and rugged.

SUMMARY OF THE INVENTION

The aforementioned and other objects were accomplished by the present invention. The present invention is a single-ended optical device comprising an optical waveguide having at least one core mode and a plurality of cladding modes. At least one long period grating is disposed within the optical waveguide and couples light from the core mode to the cladding modes. A reflector is positioned in an operable relationship to the long period grating, and the reflector reflects a signal. A mode stripper is positioned after the long period grating and removes the cladding modes from a transmitted signal and the reflected signal.

The main feature of the invention is the mode stripper which is used in combination with the reflector. The mode stripper removes the cladding modes from the transmitted and reflected signals before propagating them through the long period grating a second time. The mode stripper is either a modified surface region positioned between the long period grating and the reflector, or, alternatively, is a masked reflector.

The single-ended optical device may be arranged such that a broadband light source is positioned at a first end of the optical waveguide. A splitter, having a first input, a second input, and at least one output, is positioned between the broadband light source and the long period grating. The broadband light source is coupled to the first input and a detector is coupled to the second input.

When preparing the single-ended optical device of the present invention, an optical waveguide having a first end and a second end, a core and a cladding is provided. A long period grating is written into the optical waveguide core. The cladding between the long period grating and the second end is modified to change the propagation conditions in the waveguide wherein cladding mode light is removed from transmitted and reflected signals. The second end of the optical waveguide is modified to make the cladding and the core essentially or nearly flat. Lastly, a reflector is deposited on the modified second end of the optical waveguide.

Alternatively, the single-ended optical device of the present invention may be prepared according to the following process. An optical waveguide having a first end and a second end, a core and cladding is provided. A long period grating is written into the core. The optical waveguide is modified at the second end to make the cladding and the core essentially flat. A reflector is deposited on the essentially flat core of the optical waveguide. In this process the mode stripper and the reflector are encompassed by the reflective coating deposited on the core of the optical waveguide.

Either method may be used to fabricate the single-ended optical device and once fabricated, a broadband light source is positioned at the first end of the optical waveguide. A splitter, having a first input, a second input and at least one output is positioned between the broadband light source and the long period grating. The broadband light source is then coupled to the first input. Lastly, a detector is coupled to the second input.

The single-ended optical device of the present invention is used for detecting changes in an environmental parameter. The aforementioned single-ended optical device is provided along with the broadband light source, splitter, and detector. Light is launched in the optical waveguide core; the single-ended optical device is exposed to an environmental parameter; and the light contacts the long period grating. The long period grating couples the light from the core mode to the cladding modes. Light is stripped from the cladding modes and the remaining light is reflected back through the long period grating. The spectral profile of the reflected light is detected and used to infer changes in the environmental parameter of interest.

The device of the present invention offers several advantages over that of the prior art. It allows a long period grating to be used in reflection without implementing external methods to return the signal down the fiber. The mode stripper makes it possible to produce high isolation of the long period grating in reflection and good coupling efficiency, something which was not achievable in the past. The reflector of the single-ended optical device is not sensitive to external perturbations. Lastly, the fabrication processes are inexpensive and time efficient, producing a device which is compact and rugged.

Additional objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

DETAILED DESCRIPTION OF THE PREFERRED EMBODIMENTS

Referring now to the drawings where similar parts are labeled the same.

Figure 1:
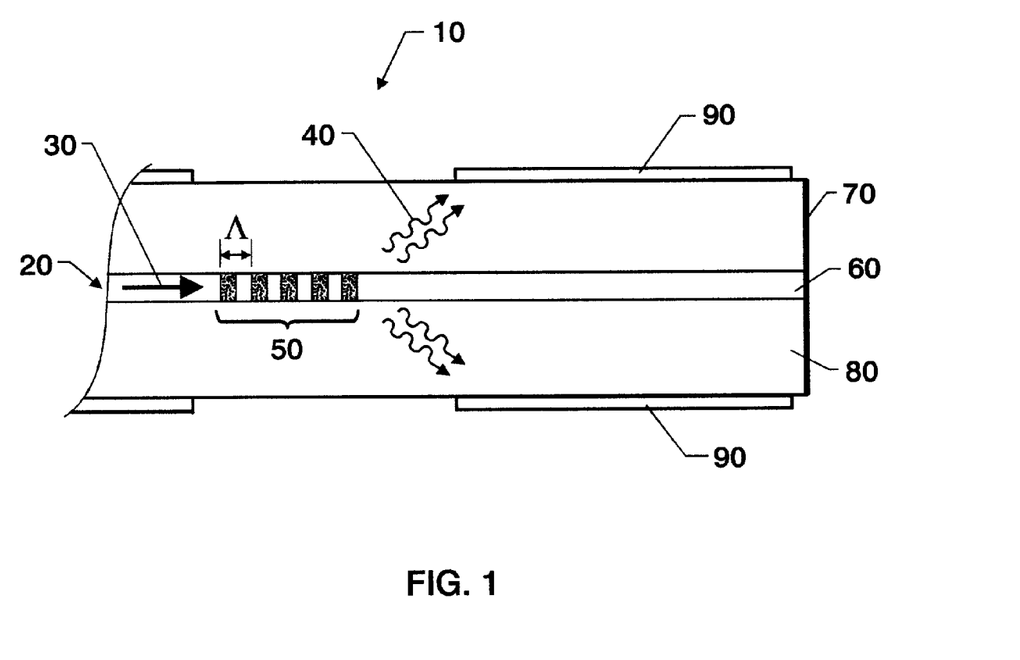
FIG. 1 is a cross-sectional view of the single-ended optical device of the present invention.
Figure 2:
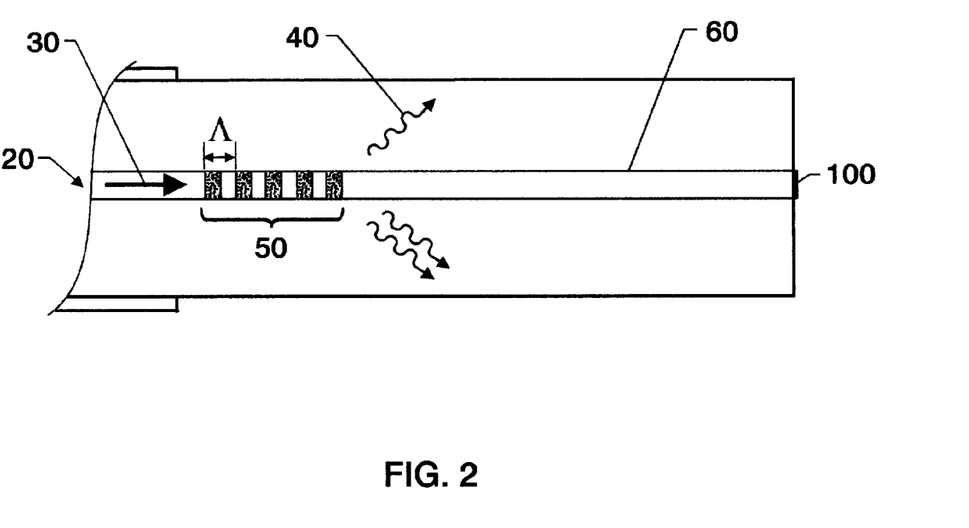
FIG. 2 is a cross-sectional view of the single-ended optical device of the present invention having a masked reflector serving as the mode stripper and the reflector.
Figure 3:
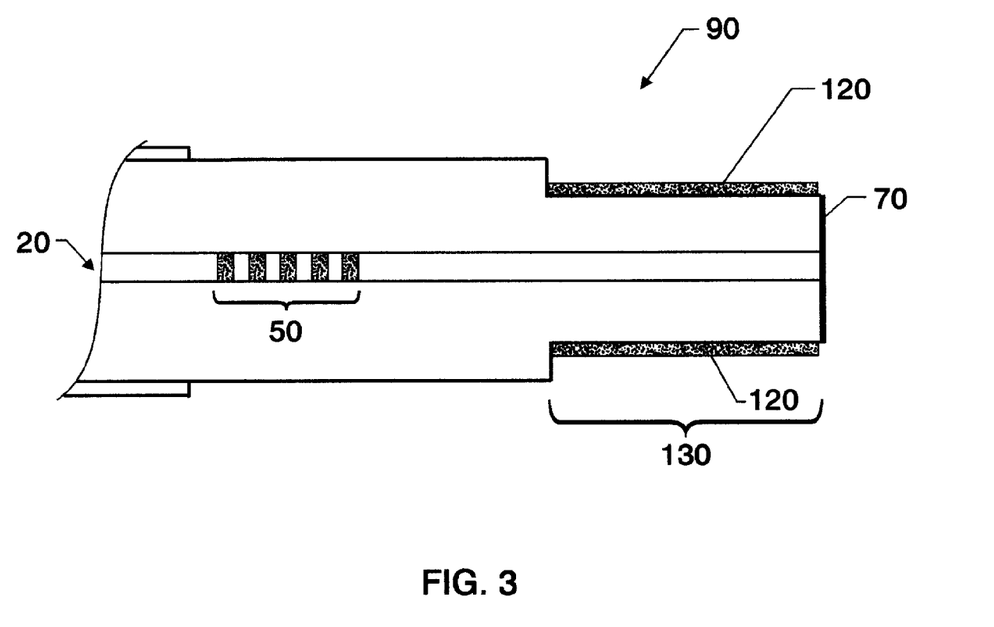
FIG. 3 shows the modified surface region as an etched portion of the optical waveguide.

FIG. 1 depicts the single-ended optical device 10 of the present invention. The single-ended optical device 10 comprises an optical waveguide 20 having at least one core mode 30 and a plurality of cladding modes 40. The optical waveguide 20 is any optical waveguide known to those skilled in the art. In particular, the optical waveguide is selected from the group consisting of: a planar optical waveguide; an integrated optical waveguide; and a fiber optic waveguide. Preferably, the optical waveguide is a fiber optic waveguide as shown in FIG. 1–3.

At least one long period grating 50 is disposed within the optical waveguide 20. FIG. 1 shows a long period grating 50 disposed within the core 60 of the optical waveguide 20. The long period grating 50 is written into the core of the optical waveguide using standard techniques known to those skilled in the art. The resulting long period grating 50 has a plurality of index perturbations spaced apart by a periodic distance Λ. Preferably, the periodic distance is 10 $\mu m \leq \Lambda \leq 1500$ $\mu m$. Although only one long period grating 50 is shown in FIG. 1, more than one long period grating may be disposed within the optical waveguide core. In addition, the periodic distance Λ between each perturbation does not have to be equidistant. The long period grating 50 couples light from the core mode to the cladding modes.

A reflector 70 is positioned in an operable relationship to the long period grating 50 and functions to reflect a signal. For the purpose of this specification and the appended claims, a reflector is defined as any element that is capable of reversing the direction of a propagating signal. The reflector eliminates the need to write broadband gratings at the optical waveguide tip. Broadband gratings are sensitive to external perturbations, which are undesirable for the present application. The operable relationship between the reflector 70 and the long period grating 50 is such that the reflector 70 is positioned at one end 80 of the optical waveguide 20 but proximate to the long period grating 50. The distance between the reflector 70 and the long period grating 50 is short (less than about 7.62 cm) thus requiring a mode stripper to remove the light from the optical waveguide. It is important that this distance remain as short as possible in order to keep the device compact. In fabricating the device, the end 80 of the optical waveguide must be modified to make the core and cladding essentially or nearly flat. This modification process is any process wherein the core and the cladding are made relatively flat. In particular, the optical waveguide may be cleaved or polished to expose the core and cladding. Regardless of the method used, the optical waveguide must be modified to make the core and the cladding into a relatively flat surface on which the reflector is deposited. Although FIG. 1 depicts the flat surface as being in an orthogonal relationship to the optical waveguide, the surface may be modified such that it is angled. The reflector 70 is any reflector known to those skilled in the art. Specific examples of the reflector 70 include a broadface reflector which covers both the core and the cladding; a masked reflector which covers only the core of the optical waveguide; or an angled reflector. The reflector is constructed from any metal or dielectric, stacked or multilayer, for filtering any wavelengths transmitted and/or reflected, known to those skilled in the art. In particular, gold works well for total reflection of the signal, but coatings are not limited to this.

The essence of the invention lies in the mode stripper 90 which is positioned after the long period grating 50. The mode stripper 90 removes the cladding modes or cladding mode light from the transmitted and reflected signal. For the purpose of this specification and the appended claims, a mode stripper is defined as any modification which is capable of changing the propagation conditions in the waveguide to remove propagating light in the cladding modes. There are several types of mode strippers. In FIG. 1, the mode stripper is depicted as a modified surface region 90 positioned between the long period grating 50 and the reflector 70. FIG. 2 depicts an alternative embodiment for the mode stripper where the mode stripper and the reflector are combined and are replaced by a single masked reflector 100 positioned only over the core of the optical waveguide at an end after the long period grating. The masked reflector 100 consists of a reflector deposited on the endface of the optical waveguide's core and suppresses the reflection of the cladding modes.

FIG. 3 shows an embodiment where the modified surface region 90 is an etched section 130 of a fiber optic waveguide cladding. The diameter of the optical waveguide cladding is modified in a region after the long period grating 50 and a highly absorptive material 120, such as a seeded epoxy (an epoxy with particulate dispersed in it), is deposited on the etched region. This region functions in combination with a reflector 70 to remove the cladding modes before light returns through the long period grating 50. An alternative embodiment to that shown in FIG. 3 is to taper a portion of the optical waveguide cladding instead of etching it.

Preferably, surface modification of the cladding can be achieved by applying a matched index coating on a portion of the optical waveguide immediately following the long period grating as shown in FIG. 1. In this instance, there is no need to etch or taper the cladding of the optical waveguide. The refractive index of the optical waveguide cladding is matched to the refractive index of the coating. In other words, the matched index coating has a refractive index approximately equal to the refractive index of the cladding. This matched index coating is then disposed on a portion of the optical waveguide. Examples of materials which are suitable as matched index coatings include but are not limited to: epoxies, acrylate coatings, and equivalents thereof. An alternative to applying a matched index coating is to use an optically opaque material on a portion of the optical waveguide following the long period grating. The optically opaque material displays certain characteristics at a specific operable spectral region. Examples of these types of materials include but are not limited to: seeded epoxies and equivalents thereof.

Figure 4:
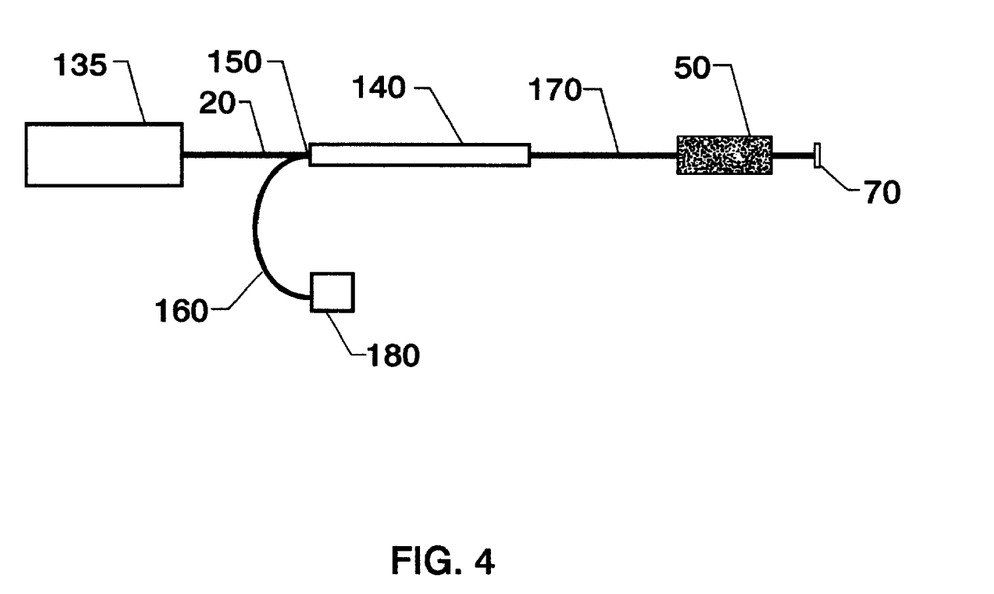
FIG. 4 depicts a single-ended optical fiber arrangement.

The single-ended optical device 10 is incorporated into an optical waveguide arrangement as shown in FIG. 4. A broadband light source 135 is positioned at a first end of the optical waveguide 20. A splitter 140 having a first input 150, a second input 160, and at least one output 170, is positioned between the broadband light source 135 and the long period grating 50. A reflector 70 is positioned after the long period grating 50. The broadband light source 135 is coupled to the first input 150. A detector 180 is coupled to the second input 160. The detector 180 detects the reflected signal.

Changes in any environmental parameter known to those skilled in the art may be detected using the aforementioned arrangement. In particular, changes in environmental parameters such as but not limited to: temperature, strain, shape, pressure, moisture, corrosion, refractive index, presence of targets, and target concentration may be measured. In use, light is launched into the optical waveguide core. The light contacts the long period grating and is coupled to the cladding modes. The single-ended optical device is exposed to an environmental parameter at the long period grating. The light is stripped from the cladding modes as it passes through the mode stripper and the remaining light is reflected back through the long period grating. The spectral profile of the reflected light is then detected.

EXAMPLE

A single-ended optical device was prepared from an optical fiber. A long period grating was written into Corning Flexcore 1060 single mode fiber. The grating was written using a frequency doubled argon-ion laser operating continuous wave (CW) with an average power of 110 mW at a wavelength of 244 nm. The fiber was side-exposed through an amplitude mask with a period of 135 microns. To prepare a bare section of fiber for exposure, the acrylate coating on the fiber was stripped by submerging a 2 cm segment in methylene chloride for 3 minutes. The grating was written in transmission and white light was propagated through the fiber and observed on an optical spectrum analyzer during the writing process. Total time of exposure was 25 minutes.

The fiber was then cleaved approximately 2 cm after the bare section containing the long period grating. The fiber after the long period grating was not stripped of its buffer jacket. The fiber endface was then coated with gold in an evaporation chamber. The thickness of the gold film on the endface was greater than 1 micron to ensure high reflectivity.

Figure 5A:
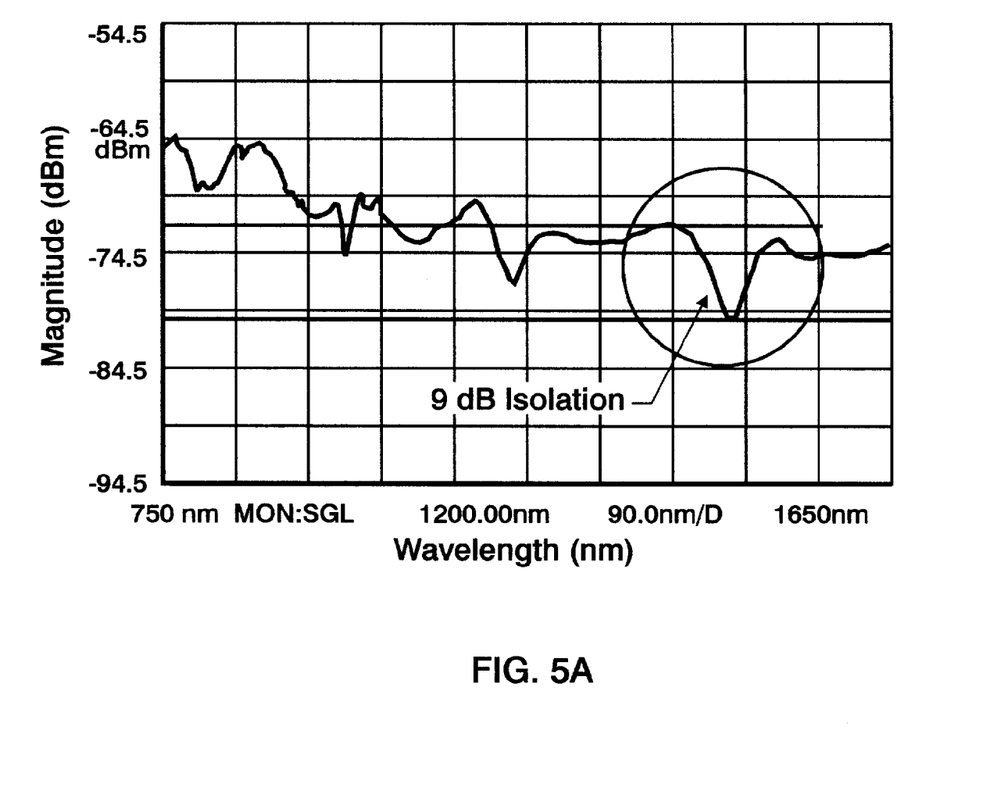
FIG. 5A is a spectral plot for a long period grating in transmission mode.
Figure 5B:
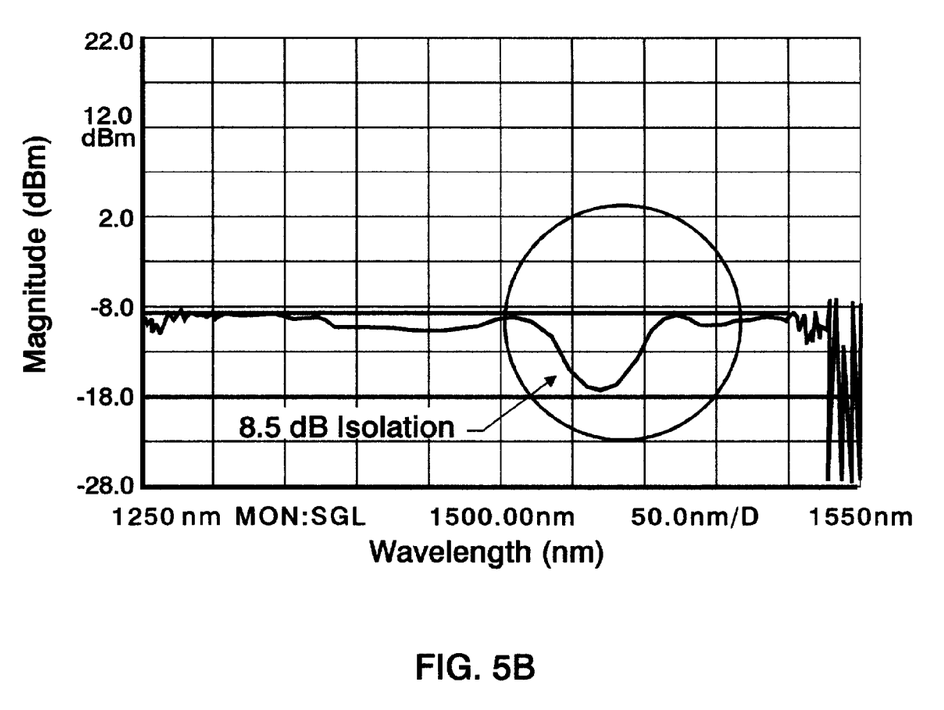
FIG. 5B is a spectral plot for a long period grating in reflection mode when a mode stripper is used.
Figure 5C:
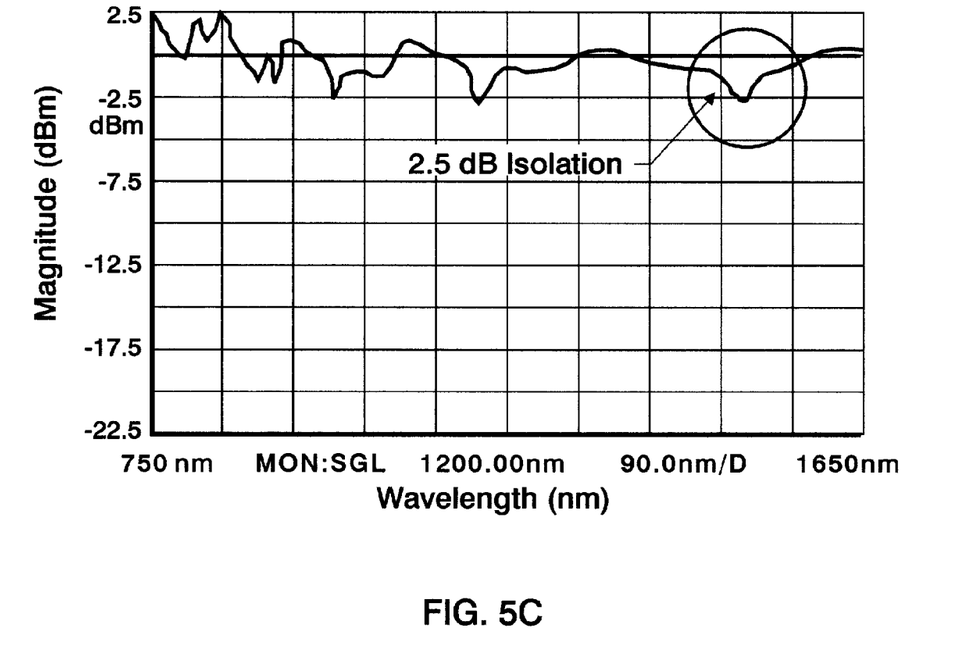
FIG. 5C is a spectral plot for a long period grating in reflection without a mode stripper.

The fiber device was then tested using a broadband 1550 LED source coupled to a 50/50 2×2 coupler. The long period grating, used in reflection, was connected to the output of the coupler as shown in FIG. 4. The first two spectral plots shown in FIGS. 5A and 5B represent the long period grating spectrum in transmission mode (FIG. 5A) and also in reflection mode (FIG. 5B). The last spectral plot shown in FIG. 5C represents an identical long period grating in reflection without the acrylate coating between the long period grating and the reflector. The lack of a clearly-defined long period grating profile shows that the mode stripper is required.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. A single-ended optical device comprising:
   an optical waveguide having at least one core mode and a plurality of cladding modes;
   at least one long period grating disposed within the optical waveguide wherein the long period grating couples light from the core mode to the cladding modes;
   a reflector, positioned in an operable relationship to the long period grating, wherein the reflector reflects a signal; and
   a mode stripper, positioned after the long period grating, wherein the mode stripper removes the cladding modes from a transmitted signal and the reflected signal.

2. A single-ended optical device according to claim 1, wherein the optical waveguide is selected from the group consisting of: a planar optical waveguide; an integrated optical waveguide; and a fiber optic waveguide.

3. A single-ended optical device according to claim 1, wherein the long period grating has a plurality of index perturbations spaced apart by a periodic distance Λ, wherein the periodic distance is 10 $\mu m \leq \Lambda \leq 1500 \mu m$.

4. A single-ended optical device according to claim 1, wherein the reflector is a broadface reflector.

5. A single-ended optical device according to claim 1, wherein the mode stripper is a modified surface region positioned between the long period grating and the reflector.

6. A single-ended optical device according to claim 5, wherein the optical waveguide has a cladding having a refractive index and wherein the modified surface region comprises a matched index coating having a refractive index approximately equal to the refractive index of the cladding wherein the matched index coating is disposed on a portion of the optical waveguide.

7. A single-ended optical device according to claim 5, wherein the modified surface region comprises an etched portion of the optical waveguide.

8. A single-ended optical device according to claim 5, wherein the modified surface region comprises an optically opaque material disposed on a portion of the optical waveguide.

9. A single-ended optical device according to claim 5, wherein the modified surface region comprises a tapered portion of the optical waveguide.

10. A single-ended optical device according to claim 1, wherein the mode stripper and the reflector are a masked reflector.

11. A single-ended optical device according to claim 1, further comprising a broadband light source positioned at a first end of the optical waveguide; a splitter, having a first input, a second input, and at least one output, wherein the splitter is positioned between the broadband light source and the long period grating, wherein the broadband light source is coupled to the first input; and a detector, coupled to the second input.

12. A single-ended optical device comprising:
    a) a fiber-optic waveguide comprising a core having at least one core mode; a cladding surrounding the core, wherein the cladding has a refractive index and supports a plurality of cladding modes; and at least one long period grating disposed within the core wherein the long period grating couples light from the core mode to the cladding modes;
    b) a reflector, positioned in an operable relationship to the long period grating, wherein the reflector reflects a signal; and
    c) a mode stripper, positioned after the long period grating, wherein the mode stripper removes the cladding modes from a transmitted signal and the reflected signal.

13. A single-ended optical device according to claim 12, wherein the reflector is a broadface reflector.

14. A single-ended optical device according to claim 12, wherein the reflector and the mode stripper are a masked reflector.

15. A single-ended optical device according to claim 14, further comprising a broadband light source positioned at a first end of the fiber-optic waveguide; a splitter, having a first input, a second input, and at least one output, wherein the splitter is positioned between the broadband light source and the long period grating, wherein the broadband light source is coupled to the first input; and a detector, coupled to the second input.

16. A single-ended optical device according to claim 12, wherein the mode stripper is a modified surface region positioned between the long period grating and the reflector.

17. A single-ended optical device according to claim 16, wherein the modified surface region comprises a matched index coating disposed on a portion of the fiber-optic waveguide and wherein the matched index coating has a refractive index approximately equal to the refractive index of the cladding.

18. A single-ended optical device according to claim 16, wherein the modified surface region comprises an etched portion of the fiber-optic waveguide.

19. A single-ended optical device according to claim 16, wherein the modified surface region comprises an optically opaque material disposed on a portion of the fiber-optic waveguide.

20. A single-ended optical device according to claim 16, wherein the modified surface region comprises a tapered portion of the fiber-optic waveguide.

21. A single-ended optical device according to claim 12, further comprising a broadband light source positioned at a first end of the fiber-optic waveguide; a splitter, having a first input, a second input, and at least one output, wherein the splitter is positioned between the broadband light source and the long period grating, wherein the broadband light source is coupled to the first input; and a detector, coupled to the second input.

22. A process for preparing a single-ended optical device, the process comprising the steps of:
    a) providing an optical waveguide having a first end and a second end, a core and a cladding;
    b) writing a long period grating into the optical waveguide core;
    c) modifying the cladding between the long period grating and the second end to change propagation conditions in the waveguide wherein cladding mode light is removed from a reflected signal;
    d) modifying the optical waveguide at the second end to make the cladding and the core essentially flat; and
    e) depositing a reflector on the modified second end of the optical waveguide.

23. A process according to claim 22, wherein the optical waveguide is selected from the group consisting of: a planar optical waveguide; an integrated optical waveguide; and a fiber optic waveguide.

24. A process according to claim 23, wherein the optical waveguide is a fiber optic waveguide.

25. A process according to claim 22, wherein the long period grating has a plurality of index perturbations spaced apart by a periodic distance Λ, wherein the periodic distance is 10 $\mu$m$\leq$Λ$\leq$1500 $\mu$m.

26. A process according to claim 22, wherein the cladding is modified by depositing a matched index coating on a portion of the optical waveguide.

27. A process according to claim 22, wherein the cladding is modified by etching a portion of the optical waveguide.

28. A process according to claim 22, wherein the cladding is modified by depositing an optically opaque material on a portion of the optical waveguide.

29. A process according to claim 22, wherein the cladding is modified by tapering a portion of the optical waveguide.

30. A process according to claim 22, further comprising:
   a) positioning a broadband light source at the first end of the optical waveguide;
   b) positioning a splitter, having a first input, a second input, and at least one output, between the broadband light source and the long period grating, wherein the broadband light source is coupled to the first input; and
   c) coupling a detector to the second input.

31. A single-ended optical device prepared by the process according to claim 30.

32. A single-ended optical device prepared by the process according to claim 22.

33. A process for preparing a single-ended optical device, the process comprising the steps of:
   a) providing an optical waveguide having a first end and a second end, a core and a cladding;
   b) writing a long period grating into the optical waveguide core;
   c) providing a mode stripper after the long period grating;
   d) modifying the optical waveguide at the second end to make the cladding and the core essentially flat; and
   e) depositing a reflector on the flat core of the optical waveguide.

34. A process according to claim 33, wherein the optical waveguide is selected from the group consisting of: a planar optical waveguide; an integrated optical waveguide; and a fiber optic waveguide.

35. A process according to claim 34, wherein the optical waveguide is a fiber optic waveguide.

36. A process according to claim 33, wherein the long period grating has a plurality of index perturbations spaced apart by a periodic distance Λ, wherein the periodic distance is 10 $\mu$m$\leq$Λ$\leq$1500 $\mu$m.

37. A process according to claim 33, further comprising:
   a) positioning a broadband light source at the first end of the optical waveguide;
   b) positioning a splitter, having a first input, a second input, and at least one output, between the broadband light source and the long period grating, wherein the broadband light source is coupled to the first input; and
   c) coupling a detector to the second input.

38. A single-ended optical device prepared by the process according to claim 37.

39. A single-ended optical device prepared by the process according to claim 33.

40. A process for detecting changes in an environmental parameter, the process comprising the steps of:
   a) providing a single-ended optical device comprising: an optical waveguide having a core, a cladding, a first end, and a second end; at least one long period grating disposed within the core; a broadband light source positioned at the first end of the optical waveguide; a splitter positioned between the broadband light source and the long period grating, wherein the broadband light source is coupled to a first input of the splitter and wherein a detector is coupled to a second input of the splitter; a reflector positioned in an operable relationship to the long period grating and opposite from the broadband light source; and a mode stripper positioned after the long period grating;
   b) launching light into the optical waveguide core wherein the light contacts the long period grating and is coupled to cladding modes;
   c) exposing the single-ended optical device to an environmental parameter;
   d) stripping the light from the cladding modes;
   e) reflecting the remaining light back through the long period grating; and
   f) detecting a spectral profile of the reflected light.

41. A process according to claim 40, wherein the mode stripper is a modified surface region.

42. A process according to claim 40, wherein the cladding has a refractive index and wherein the modified surface region comprises a matched index coating having a refractive index approximately equal to the refractive index of the cladding, wherein the matched index coating is disposed on a portion of the optical waveguide.

43. A process according to claim 40, wherein the modified surface region comprises an etched portion of the optical waveguide.

44. A process according to claim 40, wherein the modified surface region comprises an optically opaque material disposed on a portion of the optical waveguide.

45. A process according to claim 40, wherein the modified surface region comprises a tapered portion of the optical waveguide.

46. A process according to claim 40, wherein the mode stripper and the reflector are a masked reflector.

47. A process according to claim 40, wherein the optical waveguide is selected from the group consisting of: a planar optical waveguide; an integrated optical waveguide; and a fiber optic waveguide.

48. A process according to claim 47, wherein the optical waveguide is a fiber optic waveguide.

49. A process according to claim 40, wherein the long period grating has a plurality of index perturbations spaced apart by a periodic distance Λ, wherein the periodic distance is 10 $\mu$m$\leq$Λ$\leq$1500 $\mu$m.

* * * * *